United States Patent
Welsh et al.

(10) Patent No.: US 11,229,221 B2
(45) Date of Patent: Jan. 25, 2022

(54) FREEZE-DRIED COFFEE POWDER AND A METHOD FOR THE MANUFACTURE THEREOF

(71) Applicant: Koninklijke Douwe Egberts B.V., Utrecht (NL)

(72) Inventors: Joe Christopher Welsh, Banbury (GB); Tamsin Mikeala Jackson, Banbury (GB); Jonathan Patrick Mulvany, Banbury (GB); Jack Rees, Banbury (GB); Woncheal Kang, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 650 days.

(21) Appl. No.: 16/096,639

(22) PCT Filed: Apr. 27, 2017

(86) PCT No.: PCT/EP2017/060121
§ 371 (c)(1),
(2) Date: Oct. 25, 2018

(87) PCT Pub. No.: WO2017/186876
PCT Pub. Date: Nov. 2, 2017

(65) Prior Publication Data
US 2020/0367524 A1    Nov. 26, 2020

(30) Foreign Application Priority Data

Apr. 27, 2016   (GB) ..................... 1607346

(51) Int. Cl.
*A23F 5/32*    (2006.01)
*A23F 5/08*    (2006.01)
*A23F 5/36*    (2006.01)

(52) U.S. Cl.
CPC .................. *A23F 5/32* (2013.01); *A23F 5/08* (2013.01); *A23F 5/36* (2013.01)

(58) Field of Classification Search
CPC ...... A23F 5/32; A23F 5/36; A23F 5/08; A23F 5/28; A23F 5/38; A23F 5/34
See application file for complete search history.

(56) References Cited

U.S. PATENT DOCUMENTS

| 3,309,779 A | 3/1967 | Ginnette |
| 4,565,706 A | 1/1986 | Wertheim |

(Continued)

FOREIGN PATENT DOCUMENTS

| EP | 839457 | 5/1998 |
| EP | 1627568 | 2/2006 |

(Continued)

OTHER PUBLICATIONS

Combined Search and Examination Report, dated Oct. 26, 2018, from related United Kingdom Patent Application No. GB1806859.3 (6 pgs.).

(Continued)

*Primary Examiner* — Hong T Yoo
(74) *Attorney, Agent, or Firm* — Fitch, Even, Tabin & Flannery LLP

(57) ABSTRACT

The present invention provides a method for the manufacture of a freeze-dried coffee powder, the method comprising: providing a coffee extract having from 40 wt % to 55 wt % solids; adding gas to the coffee extract in an amount of from 1 NL/kg to 5 NL/kg of coffee extract, to provide a gas-containing coffee extract at above atmospheric pressure; depressurising the gas-containing coffee extract to form a foamed coffee extract; cooling the foamed coffee extract to below −40° C. without shear, or with low shear, to form a frozen coffee extract, grinding the frozen coffee extract to a (Continued)

powder; and drying the powder, wherein the step of cooling the foamed coffee extract to below −40° C. comprises: (i) cooling the foamed coffee extract to a first temperature; (ii) cooling the foamed coffee extract from the first temperature to a second temperature lower than the first temperature; and (iii) cooling the foamed coffee extract from the second temperature to below −40° C., wherein the first temperature is 1° C. above a freezing point of the foamed coffee extract and wherein the second temperature is 3° C. below the freezing point, wherein step (ii) has a duration of from 5 to 90 minutes, preferably 10 to 60 minutes.

17 Claims, 9 Drawing Sheets

(56) References Cited

U.S. PATENT DOCUMENTS

| 5,882,717 | A | 3/1999 | Panesar |
| 2010/0215818 | A1 | 8/2010 | Kessler |
| 2013/0230628 | A1 | 9/2013 | Boehm |
| 2013/0280396 | A1 | 10/2013 | Boehm |

FOREIGN PATENT DOCUMENTS

| EP | 2100514 | 9/2009 |
| EP | 2659785 | 11/2013 |
| GB | 1102587 | 2/1968 |
| GB | 1199564 | 7/1970 |
| GB | 1288758 | 9/1972 |
| GB | 1367616 | 9/1974 |
| GB | 2496265 | 5/2013 |
| WO | 2009080596 | 7/2009 |
| WO | 2010112359 | 10/2010 |
| WO | 2010115677 | 10/2010 |
| WO | 2010115697 | 10/2010 |
| WO | 2015096972 | 7/2015 |

OTHER PUBLICATIONS

Notice of Reasons for Rejection, dated Oct. 1, 2019 for Japanese Patent Application No. 2018-556363, with English Translation (7 pgs.).

Notice of Preliminary Rejection, dated Apr. 21, 2020 for Korean Patent Application No. 10-2018-7031058, with English Translation (10 pgs.).

International Search Report and Written Opinion of the International Searching Authority, dated Jul. 18, 2017 for International Application No. PCT/EP2017/060121 (11 pgs.).

United Kingdom Intellectual Property Office, Search Report under Section 17 dated Oct. 13, 2016, from related United Kingdom Patent Application No. GB1607346.2 (2 pgs.).

FREEZE-DRIED COFFEE POWDER AND A METHOD FOR THE MANUFACTURE THEREOF

CROSS REFERENCE TO RELATED APPLICATIONS

This application is a U.S. national phase application of International Application No. PCT/EP2017/060121, filed Apr. 27, 2017, which claims benefit from United Kingdom Application 1607346.2, filed Apr. 27, 2016, which are each hereby incorporated herein by reference in their entirety.

Field

This disclosure relates to a freeze-dried coffee powder which provides a crema on reconstitution and a method for making the same. In particular, the disclosure provides a method for producing a freeze-dried powder which can produce a crema of more than 0.25 ml/g, preferably more than 0.75 ml/g.

Background

Instant or soluble coffee powders are well known for expedient production of coffee beverages in the home. In essence, instant coffee is the dried water-extract of roasted, ground coffee. The beans used to make instant coffee are blended, roasted and ground as they are in the making of regular coffee. In order to make instant coffee, the roasted, ground coffee is then charged into columns called percolators through which hot water is pumped, resulting in a concentrated coffee extract. The extract is then dried to produce the final coffee composition which is sold to the consumer.

However, it is generally considered that soluble coffee powders fall short of producing the rich coffee products which are produced in cafes and coffee shops from roast and ground coffee beans. Such café-made coffee products have a rich full-bodied flavour and a small foam crema on the surface from the vigorous extraction of the coffee beans. The crema layer is desirable for the consumer as they perceive the beverage to be of improved quality compared to soluble coffee beverages.

Soluble coffee powders can generally be divided into spray-dried and freeze-dried powders, depending on how they have been produced. Both drying techniques are well known in the art. Spray-dried coffee powders are often considered to be of inferior quality to freeze-dried powders because the high temperature processing leads to a loss of coffee volatiles. In contrast, freeze-drying relies on low temperatures and sublimation, so it is possible to retain more of the volatile coffee aroma profile. However, conventional commercial soluble coffee powders produced with either drying technique do not generally produce a satisfying crema.

There have been a number of developments in recent years to tackle the problem of providing a crema on a soluble coffee. This development has focused on trapping gas, typically pressurised gas, in pores within the powder so that it is released when the powder is dissolved.

A number of techniques are known for trapping gas to form a crema, but these typically focus on spray-drying since the method lends itself to the formation of closed pores. EP839457, for example, describes a process for the production of self-foaming spray-dried porous coffee powder. Upon dissolution, the powder is said to form a distinct crema layer.

In contrast, due to the sublimation drying of freeze-drying, the particles have open pores. These are caused by the loss of moisture leaving the particles by sublimation.

In order to provide a powder that resembles a more desirable freeze-dried coffee, but which provides a foam, there have been a number of attempts to make a spray-dried powder look like freeze-dried powder. WO2010112359 describes a process whereby a porous base powder is sintered to form a porous slab. This slab is then texturized to form a granulated product. Upon dissolution, the porous base powder causes the generation of a foam layer. This product is a freeze-dried look-a-like product, but could not be called freeze-dried in the market.

WO2010115697 describes a process whereby a porous base powder is produced through spray-freezing. This powder is then cold-sintered and freeze-dried to form a granulate structure that forms a crema layer upon dissolution.

Other attempts to make a foaming freeze-dried powder have tried to supplement a freeze-dried powder with spray-dried powder to provide the extra foaming effect. For example, WO2015096972 describes a process whereby a partially melted frozen product has porous powder stuck to the surface, the product is then re-frozen and freeze-dried. The porous powder provides a foam layer on dissolution. This process would be quite expensive and the foam layer is not comparable to a spray-dried product.

EP2100514 describes a process whereby a porous coffee powder is chilled and then blended with a partially frozen coffee extract. The mixture is then frozen before the porous powder dissolves. The frozen mixture is then freeze-dried. Upon dissolution the product forms a crema layer.

US2013230628 and US2010215818 relate to methods for the production of instant beverage granules which, upon reconstitution with water, form a foamy upper surface.

EP1627568 relates to a process for preparing an instant beverage is provided which includes heating a dried soluble coffee under sufficient pressure thereby forcing gas into internal voids of the dried coffee.

All of the above disclosures rely on a porous powder to deliver the crema layer. Many cite a so called 'foaming porosity' which is the percentage of the particle volume that is comprised primarily of closed pores or voids which, in some cases, includes voids with an opening of less than 2 μm. Moreover, the above processes add significant complexity and cost to the freeze-dried coffee process.

U.S. Pat. No. 3,309,779 relates to a method of dehydrating solids-bearing liquids.

GB1102587 and GB1367616 relate to coffee extract powders produced by foaming an aqueous coffee extract with an inert gas before freeze-drying. GB1288758 relates to a similar method with fines recycling. GB1199564 relates to an alternative freeze-drying method.

Summary

Accordingly, it is desirable to provide a freeze-dried coffee with a realistic crema and a method for making the same and/or to tackle at least some of the problems associated with the prior art or, at least, to provide a commercially viable alternative thereto.

In a first aspect there is provided a method for the manufacture of a freeze-dried coffee powder, the method comprising:

providing a coffee extract having from 40 wt % to 55 wt % solids;

adding gas to the coffee extract in an amount of from 1 NL/kg to 5 NL/kg of coffee extract, to provide a gas-containing coffee extract at above atmospheric pressure;

depressurising the gas-containing coffee extract to form a foamed coffee extract;

cooling the foamed coffee extract to below −40° C. without shear, or with low shear, to form a frozen coffee extract, grinding the frozen coffee extract to a powder; and drying the powder, wherein the step of cooling the foamed coffee extract to below −40° C. comprises:
  (i) cooling the foamed coffee extract to a first temperature;
  (ii) cooling the foamed coffee extract from the first temperature to a second temperature lower than the first temperature; and
  (iii) cooling the foamed coffee extract from the second temperature to below −40° C., wherein the first temperature is 1° C. above a freezing point of the foamed coffee extract and wherein the second temperature is 3° C. below the freezing point, wherein step (ii) has a duration of from 5 to 90 minutes, preferably 5 to 60 minutes, preferably 10 to 60 minutes, most preferably 10 to 30 minutes.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

BRIEF DESCRIPTION OF THE FIGURES

The invention will now be described in relation to the following non-limiting figures, in which.

DETAILED DESCRIPTION

Figure 1A:
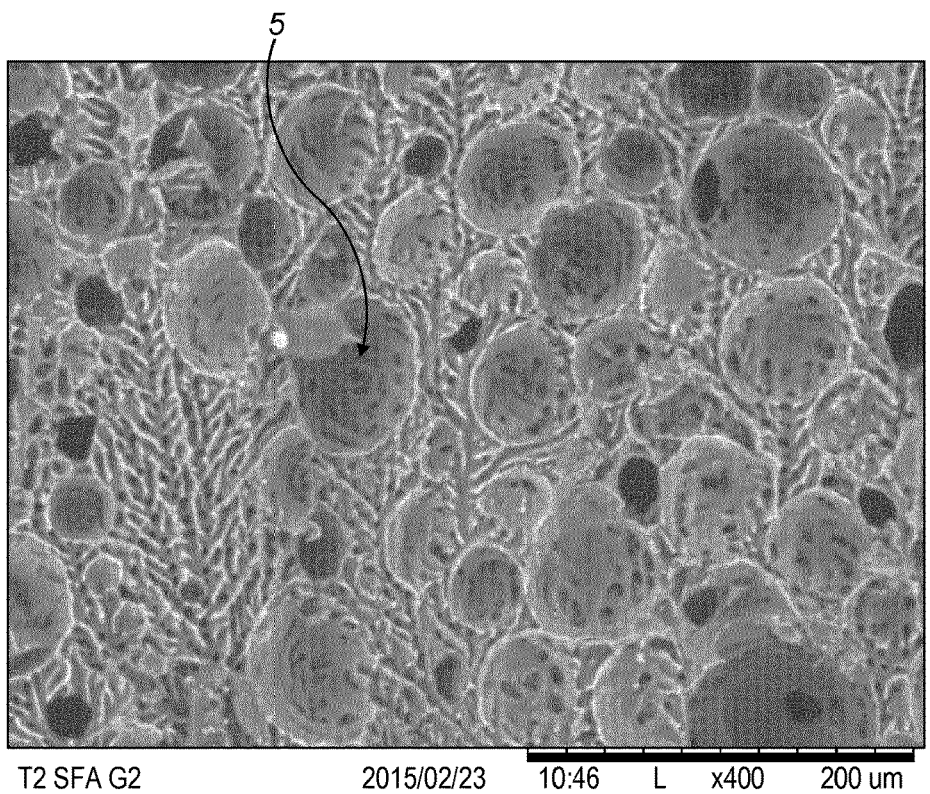
FIG. 1A is an SEM image of a cross-section through a conventional freeze-dried coffee particle.

The method requires the provision of a coffee extract having from 40 wt % to 55 wt % solids. Preferably the coffee extract has from 45 to 53% solids and most preferably from 48 to 51 wt % solids. By solids it is meant the amount of material that remains if the extract is fully dehydrated as a percentage by weight of the original extract. Thus, a 50 wt % solids extract is 50 wt % water. Preferably the solids are dissolved coffee solids. Optionally the solids may also contain roast and ground coffee particles and/or cocoa powder in an amount of up to 20 wt % of the extract, more preferably less than 15 wt % and most preferably less than 10 wt %. However, preferably the solids consist of dissolved coffee solids.

When the level of solids is low, the freeze-drying process is energy intensive due to the amount of water vapour that needs to be removed. When the level of solids is high, there may be insufficient water in the extract to form the necessary ice-crystal void structure required to form the foaming freeze-dried coffee powder.

The coffee extract used as starting material in the process may be prepared by any desired extraction technique. For example, the aqueous extract may be prepared by counter-current percolator extraction of coffee. Such extracts may need to be concentrated in order to achieve the desired level of soluble coffee solids. For example, an extract containing 10 to 20% by weight of soluble coffee solids, is then concentrated, for example by evaporation or freezing, until a concentration of 40 to 55% solid matter is reached. When the concentration is effected by evaporation, it may be preferable first to strip the volatile aromatics from the dilute extract. The aromatics thus recovered may optionally be combined with all or a part of the aromatics stripped from the ground coffee before extraction and may then be added to the concentrated extract before drying or be plated onto the powdered product.

According to a first step, gas is added to the coffee extract to provide a gas-containing coffee extract at above atmospheric pressure. The gas is typically injected under pressure into already-pressurised extract. The pressure of the gas is slightly above that of the extract to prevent back-pressure in the gas addition line. Preferably the extract is at a pressure of at least 5 Bar, preferably from 5 to 250 Bar, more preferably from 10 to 150 Bar and most preferably from 50 to 100 Bar. When the gas is added at these high pressures it is typically added in the high pressure pipes leading directly to the spraying nozzle(s) discussed below (i.e. in-line gas injection).

Preferably the gas is selected from nitrogen, air, argon, nitrous oxide and carbon dioxide or a mixture of two or more thereof. The inert gases of nitrogen and carbon dioxide are preferred to avoid degradation of the coffee flavours during storage of the final powder. Nitrogen is further preferred due to its tendency to form smaller, more stable gas bubbles.

The gas is added in an amount of from 1 NL/kg to 5 NL/kg of coffee extract, more preferably in an amount of from 3 to 4.5 NL/kg of coffee extract. That amount of gas added can be readily determined with metered addition of the gas to the coffee extract. The amount of gas added determines the gas bubble structure and gas bubble void amount within the final structure. Gas addition methods can have different levels of gas loses and accordingly, the above range represents the desired gas addition levels with a process with only minimal loses. For a process with higher loses, more gas may be required. The gas is measured in normalised litres per kilogram, as determined at 1 atmosphere and 20° C., since this allows for an absolute measure of the gas used regardless of the pressure of gas addition.

An alternative approach to the injection under pressure into already-pressurised extract is mixing the extract with added gas in a mixer. Suitable mixers include high-shear mixers such as a Mondo mixer. This addition can be performed at a lower pressure, with the gas-containing extract being subsequently pressurised, such as with a pump. Nonetheless, the mixer will be under some pressure to prevent gas being lost. According to a preferred embodiment, the extract is mixed with a gas, preferably of a type and amount as described above, in a mixer operating at a pressure of from 1.25 to 5 Bar, preferably 1.5 to 3 Bar. The gas-containing extract is then pressurised after mixing with a pump to a pressure of at least 5 Bar, preferably from 5 to 250 Bar, more preferably from 10 to 150 Bar and most preferably from 50 to 100 Bar.

According to a further step, the gas-containing coffee extract is de-pressurised to form a foamed coffee extract. That is, the pressure applied to the gas-containing coffee extract is at least partially released such that the added gas expands to form a plurality of fine gas bubbles in the extract. Thus the depressurisation leads to any solubilised gas coming out of solution to form a proliferation of small and homogenous gas bubbles. The step of depressurising involves a drop in pressure, typically an abrupt drop in pressure, from the above-discussed pressures down to a lower pressure. Preferably the pressure is dropped to less than 5 Bar and preferably is dropped to atmospheric pressure. By atmospheric pressure it is meant that the foam is not subjected to any additional pressure and is in an open container.

Preferably before being depressurised the coffee extract is at a pressure of at least 5 Bar, such as 5 to 250 Bar, preferably 10 to 150 Bar, more preferably 50 to 100 Bar. It is most preferred that the coffee extract has at least a 10-fold pressure drop (e.g. from 50 to 5 Bar), preferably at least 50 fold (e.g. from 50 Bar to atmospheric pressure). The inventors found that the larger the drop, the more stable the resultant foam.

Depressurising the gas-containing coffee extract can be by use of an orifice, or a nozzle, such as a spraying nozzle. Spraying techniques are well known in the art and any spraying nozzle, such as a spray-drying nozzle, can be used. The gas-containing extract may be further pressurised before spraying. Preferably gas-containing coffee extract is sprayed through a nozzle at a pressure of from 30 to 150 Bar to form the foamed coffee extract.

If the foamed coffee extract is at atmospheric pressure then, due to the amount of gas added, the extract will typically have a density of from 500 to 800 g/l. Preferably the foamed coffee extract has a density of from 650 to 750 g/l.

Preferably the aeration step consists of pressurisation and de-pressurisation steps as discussed above, preferably with gas injection into pressurised extract. This is particularly advantageous as it provides a stable foam with a proliferation of small bubbles. The problem solved is to create a stable foam at temperatures that prevent ice crystal formation. According to an alternative embodiment, as discussed above, a high shear mixer is used to create a stable foam with gas bubbles of average size of around 5 microns, such as that described in EP839457. Such a high shear mixer would typically operate under a pressure of up to 5 Barg, preferably from 2 to 4 Barg, more preferably from 3 to 4 Barg. However, the final foam levels achieved by the final product of this foam preparation method may be less than those produced by higher levels of pre-pressurisation associated with in-line injection.

According to a further step, the foamed coffee extract is cooled to below −40° C. to form a frozen coffee extract. It will be appreciated that the coffee extract before this step will generally be at a temperature of from 10 to 50° C. for ease of handling, such as spraying, and any elevated temperature above room temperature will typically be the result of preceding processing steps. The foamed extract is desirably passed directly to a cooling vessel or cooling belt in order to minimise any loss of foam.

The step of cooling to below −40° C. to form a frozen coffee extract is a conventional step in freeze-drying. As will be appreciated, the cooling may reach a final temperature of −45° C. or below, such as −50° C. or −60° C. However, unlike conventional freeze-drying, it is essential that this step is performed without applying high shear to the foamed coffee extract. Indeed, preferably the cooling is carried out without applying shear. In an alternative embodiment, low shear may be applied to improve heat transfer, such as by slow mixing or such as that experienced by passing the extract through a simple heat exchanger (i.e. without baffles) . Indeed, it is essential that the foamed coffee extract is not vigorously mixed, stirred, agitated or shaken during the cooling step, especially during the cooling step wherein the ice crystals are formed. It is thought that agitation leads to the breakdown of large ice crystals, preventing the desirable larger ice crystal growth and also appears to encourage the ice-crystals to penetrate the gas bubbles to result in greater interconnectivity.

As noted above, preferably the level of shear is zero. However, in certain embodiments, a low level of shear is acceptable. Methods of measuring or calculating shear are well known in the art: for example, "CFD analysis of the flow pattern and local shear rate in a scraped surface heat exchanger" Chemical Engineering and Processing, Yataghene et al. 47 (2008) 1550-1561 discusses sheer in a SSHE. It is considered that low levels of shear which are permissible are less than 50 $s^{-1}$, preferably less than 25 $s^{-1}$, more preferably less than 15 $s^{-1}$ preferably less than 5 $s^{-1}$. In contrast, levels of shear in typical processing apparatus, such as SSHE will be at least 200 s$^{-1}$.

The step of cooling the foamed coffee extract to below −40° C. is typically a continuous process which may be performed in various ways. For example, the foamed coffee extract may be sprayed into trays and moved, such as on a conveyor or manually, between cool rooms or zones held at different temperatures to control the cooling rate. Alternatively, the foamed extract may be held in a cooling vessel where the vessel and contents are cooled at a controlled cooling rate. Alternatively, the foamed extract may be passed through a heat exchanger such that the cooling rates can be controlled.

Preferably one or more of the cooling steps (i), (ii) and (iii) are conducted as a continuous process using a conveyor. Preferably one or more of the cooling steps (i), (ii) and (iii) are conducted in a holding vessel or within a pumped cooling system. For example, the steps (i) and (iii) may be conducted with a conveyor, while the slow cooling in step (ii) may rely on a cooling vessel, such as a cooling drum, for best cooling control. Preferably all of the cooling steps (i), (ii) and (iii) are conducted as a continuous process using a conveyor.

Where the cooling steps are carried out in a cooling vessel, a preferred cooling vessel is a gently agitated vessel with a cooling jacket, the cooling jacket containing fluid between −10 and −16° C. The agitator speed, in order to minimise shear is less than about 15 rpm, preferably less than 12 rpm. The residence time in the cooling vessel should at least comprise of the required cooling time as defined by step (ii).

The step of cooling the foamed coffee extract to below −40° C. is carried out such that there is a slow controlled cooling of the foamed coffee extract as it is cooled at least in the region of the freezing point of the coffee extract. This ensures controlled crystal growth. In general, the rate of cooling down to the freezing point and once the extract is frozen is not particularly important, except that fast cooling is more useful for industrial process volumes.

The term "freezing point" as used herein is intended to be synonymous with the melting point of the equivalent frozen coffee extract. As will be appreciated, the precise temperature at which the entirety of an extract freezes may not always equate exactly with the melting temperature, depending on the rate of cooling. However, the melting point of a specific extract can be measured more readily. Moreover, the aim of the method described herein is that the extract freezes very close it the freezing/melting point temperature.

Accordingly, the step of cooling the foamed coffee extract may be considered as three separate steps. These include a first step in which the extract is cooled to a first temperature which is 1° C. above a freezing point of the foamed coffee extract; a second controlled cooling step which cools the foamed coffee extract from the first temperature to a second temperature, lower than the first temperature, which is 3° C. below the freezing point; and a third step of then cooling the foamed coffee extract from the second temperature to below −40° C. The controlled second cooling step has a duration of from 5 to 90 minutes, preferably 5 to 60 minutes, preferably 10 to 60 minutes, more preferably 10 to 30 minutes and most preferably 20 to 30 minutes. If the cooling is too fast, then the ice crystals are of insufficient size. If the cooling is very slow (Step ii) lasting more than 60 minutes and certainly when longer than 90 minutes), then the ice-crystals can grow so large that the structural integrity of the particles is compromised leading to faster dissolution. 5 to 30 minutes is preferably chosen as it leads to preferable product quality at commercially feasible freezing times. However, it is thought that a Step (ii) freezing period of 30-90, preferably 30 to 60 minutes would give comparable product performance. It should be noted that when considering a continuous freezing process, such as a cooled low shear agitated vessel, the step (ii) duration refers to the residence time of the aerated extract in the vessel at the described temperatures.

Preferably the rate of cooling in the first and third steps of cooling will be at least −5° C. per minute, preferably at least −10° C. per minute. This step could be achieved in a heat exchanger or on a freezing belt, providing no ice crystals are formed in the cooling step (i). As will be appreciated, the cooling in the first and third steps may also be slow controlled cooling at temperatures abutting the second cooling step.

The freezing point of a coffee extract varies depending on the level of soluble coffee solids contained in the extract. The freezing point can be determined by DSC and is well documented in literature documents. When the coffee extract has from 40 to 45 wt % dissolved coffee solids, the freezing point is from −5 to −7° C. When the coffee extract has from 45 to 50 wt % dissolved coffee solids, the freezing point is from −7 to −8° C. When the coffee extract has from 50 to 55 wt % dissolved coffee solids, the freezing point is from −8 to −10° C.

Figure 8:
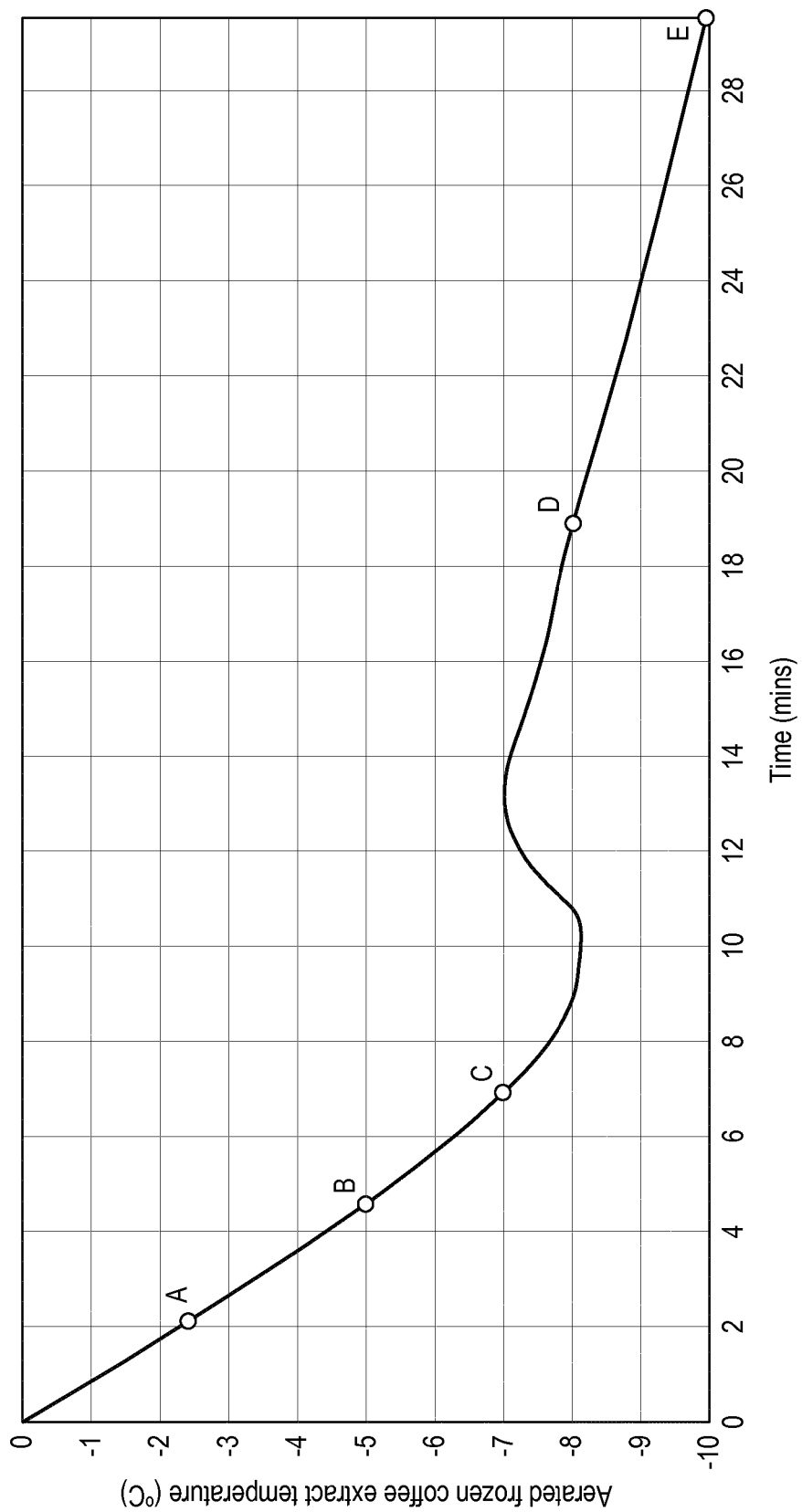
FIG. 8 shows a portion of an exemplary cooling profile highlighting the step (ii) discussed herein. The y axis is the aerated frozen coffee extract temperature (° C.), declining from 0 to −10. The x axis is time (minutes–incrementing in 2 min units). A indicates a point within the fast freezing step (i). C represents the freezing point temperature and, as can be seen, there is a low degree of supercooling beyond this point. The sample is held between B and E (−5 and −10° C.) for about 25 minutes and between C and D for about 15 minutes.
Figure 9:
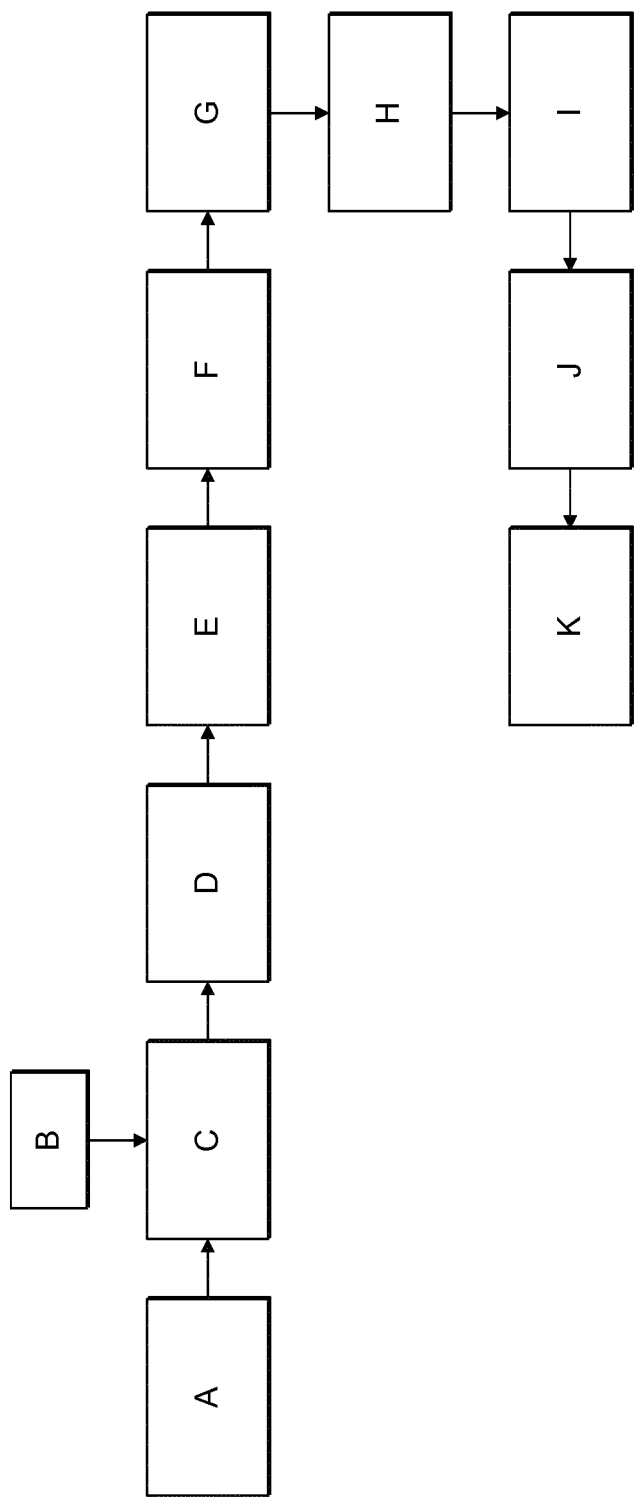
FIG. 9 shows a flow-chart of a practical embodiment of the method described herein.

The rate of cooling in the second cooling step will typically be less than −1° C. per minute, preferably less than −0.5° C. per minute. This slow rate of cooling is performed to encourage the growth of a small number of larger crystals. Faster cooling would risk the formation of a lot of smaller crystals. The slow cooling is achieved with a low degree of supercooling which is the driving force for the desirable crystal growth. Supercooling reflects the extent to which the extract reaches a temperature below its freezing point before freezing. Low levels of supercooling are achieved by the use of a coolant which is not much colder than the extract during cooling. Preferably the temperature of the extract does not reach more than 1° C. below the freezing point before freezing is complete. An example of a cooling profile showing supercooling is shown in FIG. 8; the temperature initially falls below the freezing point, causing a degree of super-cooling to exist within the system, this provides the driving force required for spontaneous nucleation of ice-crystals, as the ice crystals begin to form and grow the temperature of the extract rises due to the enthalpy of fusion.

The slow cooling can preferably be achieved using a coolant during step (ii), such as with a heat exchanger. As is known in the art, the wall temperature experienced by the product stream will not be equal to the coolant temperature and will depend on the wall thickness of the heat exchanger, the thermal conductivity of the material of construction, as well as the flow regime of the coolant. As a guide, the coolant preferably has a temperature of no colder than −16° C., and is preferably less than 7° C. cooler than the freezing point, more preferably less than 5° C. cooler than the freezing point. Obviously the coolant cannot be above the freezing point during step (ii), otherwise crystal growth would not be achieved. The use of a coolant at a temperature so close to the freezing point helps to encourage ice crystal growth without supercooling at the interface between the coolant and the extract (such as at a heat exchanger or crystalliser interface). When using a conveyor belt, the coolant may take the form of a cooled gas flow; in such a case the heat transfer, which is a function of the air temperature and velocity, can be calculated to avoid supercooling.

Once the foamed coffee extract is cooled to below −40° C. to form a frozen coffee extract, the frozen coffee extract is ground and dried using conventional methods to form a freeze-dried coffee powder.

For example, once frozen the extract may be obtained as a continuous rigid sheet which may then be broken up into fragments suitable for grinding. These fragments may, for example, be ground to a particle size which is preferably within the range 0.5 to 3.5 mm. Grinding techniques are well known in the art.

The ground frozen powder is dried by sublimation. For example, this may be in conventional cabinets, on trays which are loaded to a layer thickness of, for example, 25 mm. The sublimation of the ice crystals is effected under a high vacuum, of <1 mbar, and generally lasts up to 7 hours. Thereafter, the product may be packed as desired.

The inventors have found that the addition of gas into the extract under pressure results in solubilisation of gas and an altered bubble structure. This along with the new freezing process with low, or preferably no, shear creates a new ice crystal structure. The combination leads to an unexpected improved foam performance.

Figure 1B:
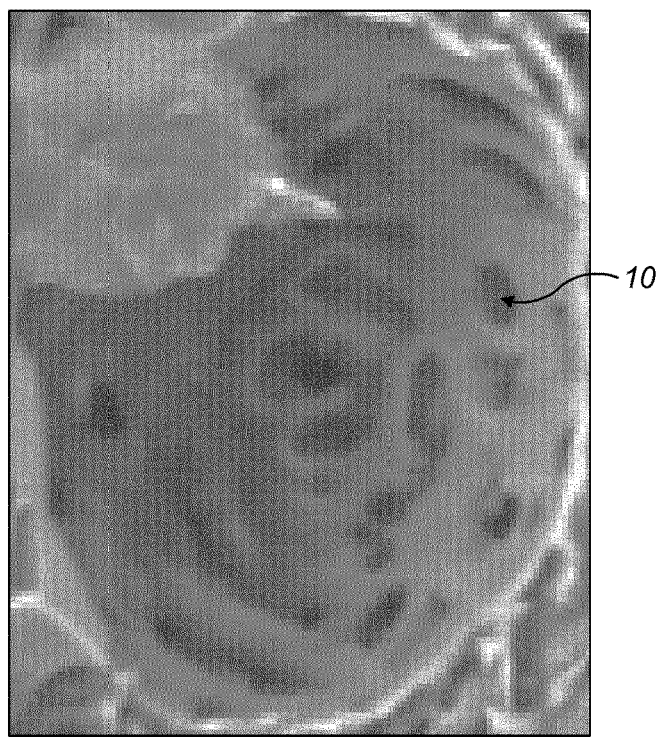
FIG. 1B is a close-up view of a gas bubble 5 showing connection points 10 from ice-crystal pores 15.
Figure 2A:
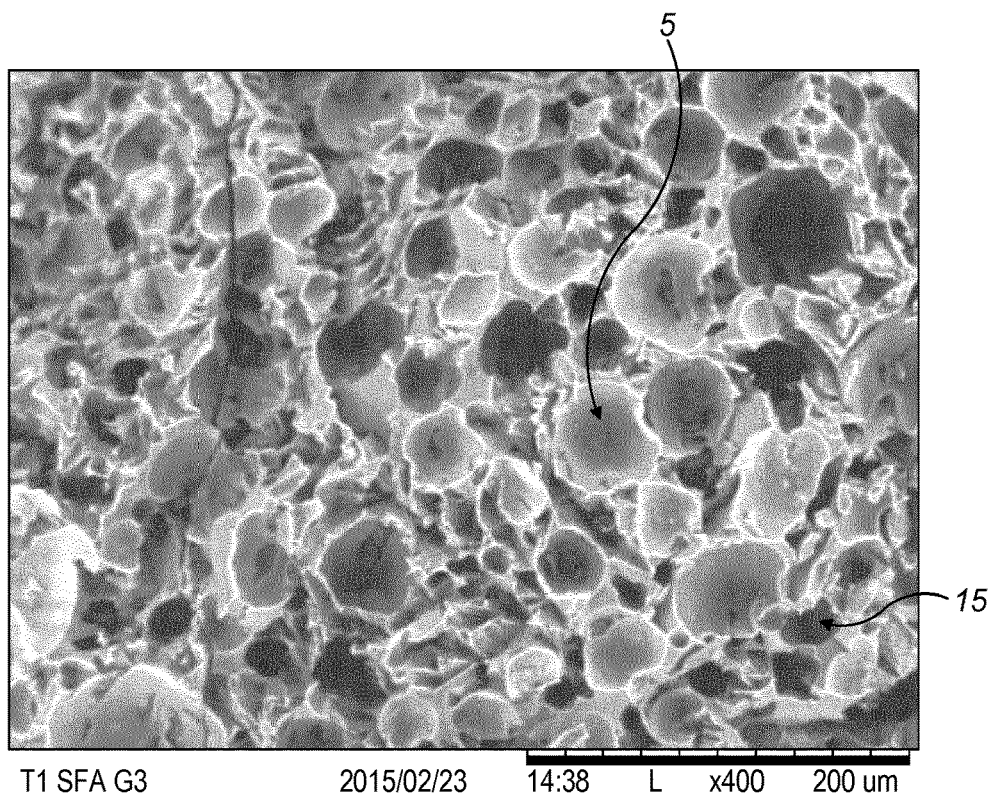
FIG. 2A is an SEM image of a cross-section through a freeze-dried coffee particle produced using the method disclosed herein.
Figure 2B:
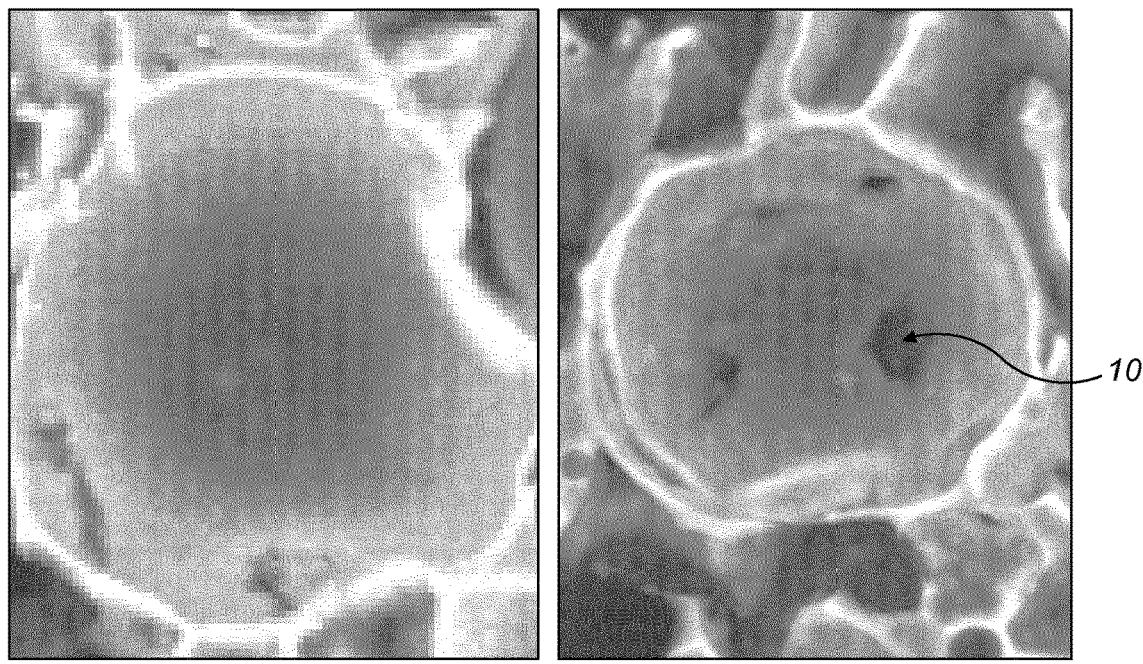
FIG. 2B is two close-up views of gas bubbles 5 showing connection points 10 from ice-crystal pores 15.
Figure 3A:
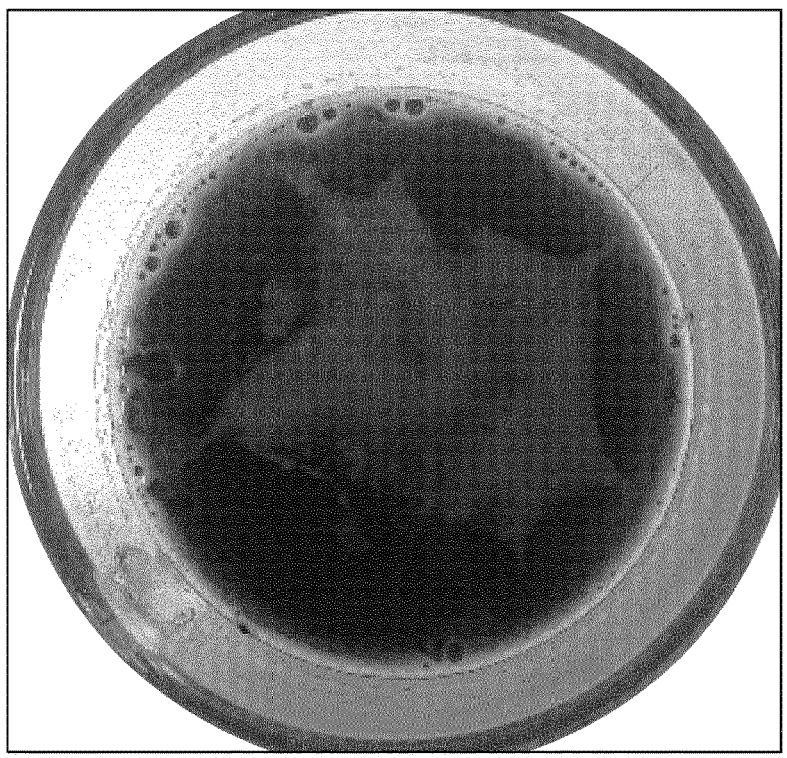
FIG. 3A shows a crema produced with a conventional freeze-dried coffee.
Figure 3B:
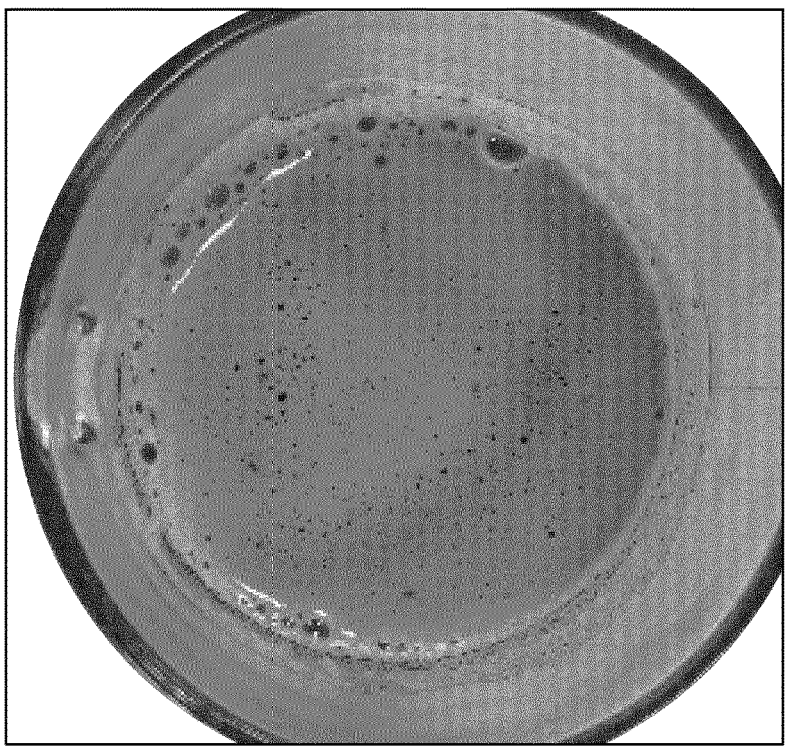
FIG. 3B shows a crema produced with a freeze-dried powder produced according to the method disclosed herein.

Without wishing to be bound by theory, it is considered that the aeration and cooling method ensures no premature nucleation of ice. Furthermore the new cooling method prevents a high degree of super-cooling during the step (ii) freezing process. A high degree of super-cooling leads to a high driving force for ice crystal nucleation, a fast rate of nucleation and a small average crystal size. Therefore, by controlling this super-cooling step, the new freezing method allows the growth of large ice crystals during the slow freezing step. This altered ice crystal structure combines with the new gas structure formed from the solubilisation of gas to provide a new micro-structure. This structure reduces the interconnection of the ice crystal pores and the gas bubbles (see FIGS. 1B and 2B). This in turn seems to slow water ingress into the structure, allowing discrete gas bubbles to be released steadily during dissolution, which are subsequently stabilised by the dissolving coffee matter. Thus the gas is released in a controlled way to create foam layer, rather than prematurely lost into the atmosphere on reconstitution as occurs in the prior art products, where large pockets of gas can be seen quickly exiting the dissolving coffee particles.

Indeed, the present method creates a true freeze-dried product that, through the manipulation of the internal particle structure, allows it to deliver a crema layer. This is achieved through altering how the granule dissolves, by manipulating the gas bubble and ice-crystal micro-structure. Surprisingly it has been found that the particles provide a desirable crema layer, even with a 'foaming porosity' of less than 15% (i.e. less than 15 v % closed pores, see Table 4) or less than 10%. This is contradictory to the approach adopted in the prior art.

Traditionally in a freeze-dried coffee process, coffee extract is cooled using a scraped surface heat exchanger (SSHE) and aerated by sparging in gas and applying a shearing motion to disperse the gas. SSHE achieve high levels of cooling in a short residence time, such as less than 5 minutes. Using a SSHE requires a low coolant temperature to effect the required cooling in the available residence time, due to heat transfer limitations. The effect of this is to cause a high degree of super-cooling at the heat exchange surface, causing the nucleation of many small ice crystals at the heat exchange surface. Inside the SSHE, the surface scraper removes these crystals from the surface and mixes them into the bulk of the coffee extract. Furthermore, the high shear rotor inside the SSHE for dispersing the gas also leads to the breakdown of ice crystals, further reducing the average size and mixing them throughout the liquor. The SSHE therefore disrupts the structure of the gas bubbles, leading to more interconnectivity. It hypothesised that this shearing motion leads to the ice crystals penetrating the bubbles in the high viscosity partially frozen foamed extract. The new freezing approach removes this nucleation and mixing process and appears to promote the growth of ice crystals around the gas bubbles, rather than allowing the ice crystals to intersect the gas bubbles, as seen in the prior art product (see FIGS. 1B and 2B).

There have previously been many attempts to affect ice crystal growth in coffee extract. Many examples of this set out with the goal of darkening the product colour. U.S. Pat. No. 3,682,650 describes a process whereby coffee extract was rapidly frozen to below the ice-point, and then held at between −6.7 to −10° C. to effect ice crystal growth to >0.5 mm to allow for freeze concentration of the extract.

WO2013064893A1 describes a process for forming a pre-frozen intermediate coffee extract that is subsequently blended with roast and ground coffee. This patent mentions holding between −6 and −10° C. in a crystalliser tank to allow for ice-crystal growth in the frozen extract.

U.S. Pat. No. 3,443,963 describes a process where ice crystal seeding and agitation are used to prevent super cooling which causes small ice crystals, the coffee extract is cooled rapidly below the ice-point and held for 10 minutes between −3.9 to −12° C. to produce dark colour finished product.

U.S. Pat. No. 3,373,042 describes a process where coffee extract is frozen to −6.7 to −9.4° C. to generate ice content to generate a dark colour finished product. The frozen extract is then extruded onto a freezing belt.

U.S. Pat. No. 3,438,784 describes a process where coffee extract is foamed and then frozen slowly to generate a dark colour product, specifically with irregular, disordered ice crystal morphology. This is in an un-aerated system, but it is mentioned that aeration can be used to control density.

U.S. Pat. No. 4,565,706 describes a process where coffee extract is cooled to below 0° C., then gas is added, then the gas is mixed with the extract. The frozen aerated extract is then found further on a belt.

Aeration of coffee extracts is also well known. Normally air, $CO_2$ or $N_2$ is mixed with the coffee extract prior to spray or freeze drying to control density. In freeze-drying, the gas is usually injected at the same time as freezing, or just after, this is to generate a stable foam prior to the secondary belt freezing step. The gas bubble structure is usually created through the use of shear, normally inside a SSHE.

EP2194795 describes a method of aerating coffee extract prior to spray drying. The extract is pressurised to between 50 and 400 bar, gas is injected and solubilised, and lastly the pressure is released through a nozzle to form a fine bubble structure inside coffee droplets.

U.S. Pat. No. 3,749,378 describes a method for producing a foamed coffee extract. Here a novel gas mixing device is used to improve gas mixing prior to spray-drying or freeze-drying.

EP839457 describes an alternative method to aerate coffee extract prior to spray drying. The method involves adding gas to a coffee extract and then using a high shear mixer to reduce the bubble size down to below 5 microns. The aerated extract is then sent to a high pressure pump before spray drying.

U.S. Pat. No. 3,682,650 describes a process whereby nitrogen gas is injected into a SSHE to control density. The gas subsequently coalesces to form large bubbles in the frozen extract, with the objective of forming a dark coloured product None of these documents teach the slow growth of ice-crystals in an aerated coffee extract, without shear force, such as mixing, being applied.

According to a preferred aspect, the method described herein includes the following steps:

providing a coffee extract having from 45 wt % to 50 wt % solids, preferably at 5 to 15° C., in a high shear mixer;

adding gas to the coffee extract in the high shear mixer in an amount of from 1 NL/kg to 5 NL/kg of coffee extract, to provide a gas-containing coffee extract at a pressure of 1.5 to 3 Bar;

pumping the gas-containing coffee to one or more spray nozzles, whereby the extract pressure before spraying is at a pressure of from 50 to 100 Bar, spraying the gas-containing coffee extract through the one or more spray nozzles to depressurise the extract and to form a foamed coffee extract, preferably at atmospheric pressure;

cooling the foamed coffee extract to below −40° C. without shear, or with low shear, to form a frozen coffee extract;

grinding the frozen coffee extract to a powder; and drying the powder, wherein the step of cooling the foamed coffee extract to below −40° C. comprises:

(i) cooling the foamed coffee extract to a first temperature, optionally in a holding tank;

(ii) cooling the foamed coffee extract from the first temperature to a second temperature lower than the first temperature, preferably in a crystalliser; and (iii) cooling the foamed coffee extract from the second temperature to below −40° C., wherein the first temperature is 1° C. above a freezing point of the foamed coffee extract and wherein the second temperature is 3° C. below the freezing point, wherein step (ii) has a duration of from 10 to 30 minutes.

An example of this preferred embodiment is shown in FIG. 8, in which the boxes correspond as follows:

A: Providing concentrated coffee extract, 45-50 wt % solids, 5-15° C.

B: Providing a source of nitrogen.

C: Mixing the gas and extract in a Mondo mixer at 1.5-3 Bar and 10-20° C.

D: A holding tank at 10-20° C.

E: A heater to increase the extract to 35-40° C. to reduce viscosity.

F: A high pressure pump to increase the pressure to 50-100 Bar.

G: Spraying the mixture into a holding tank at atmospheric pressure

H: Cooling the mixture to −3 to −5° C., target −5° C.

I: Holding the mixture in the crystalliser down to −8° C., wherein the crystalliser preferably includes a slow-speed agitator to reduce crystallisation on the inner surfaces of the crystalliser.

J: Passing the cooled mixture to a freezing belt for fast freezing with air at −50° C.

K: Grinding, sifting and drying (sublimation) of the coffee.

According to a further aspect there is provided a freeze-dried coffee powder for providing a coffee beverage with a crema of at least 0.25 ml/g on reconstitution in water, preferably at least 0.75 ml/g, the coffee powder comprising particles having open gas bubbles and ice-crystal voids and having a closed porosity of less than 15%, preferably less than 10%, wherein the open gas bubbles and ice-crystal voids have low interconnectivity such that less than 92% intrusion is achieved under a pressure of 90 psia Hg when measured by Hg porosimetry where intrusion into the particles is considered to start at 2 psia.

Preferably the powder displays less than 90% intrusion under a pressure of 90 psia Hg when measured by Hg porosimetry where intrusion into the particles is considered to start at 2 psia. Typically this intrusion is from 70 to 92% and more desirably from 80 to 90%. The low intrusion compared to the prior art represents the low interconnectivity which leads to a slower dissolution and increased foam production.

Preferably the pressure required to achieve 80% intrusion, when measured by Hg porosimetry where intrusion into the particles is considered to start at 2 psia, is at least 45 psia, more preferably at least 50 psia.

The inventors have also found a good way to characterise the internal structure of the particles of the powder using an "intrusion span". The intrusion span is defined as:

$$\frac{\text{(the pressure required for 90\% intrusion)} - \text{(the pressure required for 10\% intrusion)}}{\text{(the pressure required for 50\% intrusion)}}$$

when measured by Hg porosimetry where the intrusion into the particles is considered to start at 2 psia. Preferably the span is at least 2, more preferably from 2 to 10 and most preferably from about 3 to about 8.

Preferably the particles have an open porosity of at least 50%, preferably from 60 to 80% and most preferably from 60 to 70%.

The low interconnectivity can also be assessed such that less than 80% intrusion is achieved under a pressure of 40 psia Hg when measured by Hg porosimetry where intrusion into the particles is considered to start at 0.3 psia. Preferably less than 80% intrusion is achieved under a pressure of 45 psia Hg. Preferably less than 80% intrusion is achieved under a pressure of 47.5 psia Hg.

According to a further aspect there is provided a freeze-dried coffee powder for providing a coffee beverage with a crema of at least 0.25 ml/g on reconstitution in water, preferably at least 0.75 ml/g, the coffee powder comprising particles having open gas bubbles and ice-crystal voids and having a closed porosity of less than 15%, preferably less than 10%, wherein the open gas bubbles and ice-crystal voids have low interconnectivity such that less than 80% intrusion is achieved under a pressure of 40 psia Hg. In this aspect the operation pressure for Hg intrusion was from 0.3 psia to 60,000 psia. As will be appreciated, everything in this aspect can be applied equally to the aspect described above.

Preferably the products discussed in the aspects above are obtainable by the method described herein.

As demonstrated in the documents discussed herein, freeze-dried coffee powder is well known in the art. The term has further commercial restrictions such that a product can only be labelled as freeze-dried if it has been produced by such a technique. The method disclosed herein is such a technique as the final powder is entirely freeze-dried.

Preferably the particles are manufactured according to the method described herein.

Gas bubbles and ice-crystal voids can be readily determined by inspection of SEM images. Gas bubbles typically have rounded smooth surfaces, whereas the ice-crystal voids have sharp angles and often have a dendritic form. It is believed that the freeze-dried coffee powder described herein has a reduced pore interconnectivity compared to conventional freeze-dried powders. That is, although the ice-crystals which form do pierce and interconnect the gas bubbles in the powder, there are fewer connections within the particles. This means that the final product produces a desirable crema. The inventors have found that it is possible to identify a freeze-dried powder which can achieve this desirable level of crema by using mercury porosimetry.

Preferably the coffee powder consists of soluble coffee solids and, optionally, less than 20 wt % of roast and ground coffee particles and/or cocoa powder. More preferably the coffee powder consists of particles of soluble coffee solids only. Accordingly, there is no inclusion of other materials such as creamers or sugar.

Preferably the particles comprise open pores with substantially all of the open pores having a mean diameter of at least 5 microns. The pore size can be determined by inspection of SEM images.

Preferably the particles have a particle size distribution with a D10 of at least 300 microns. Particle size distributions are measured by laser diffractometry, such as with a Helos dry system, or through dry sieving. Such measurement techniques are well known in the art.

Preferably the open pores comprise a plurality of ice-crystal pores and a plurality of gas bubbles, wherein the ice crystal pores have a mean pore diameter of from 6 to 10 microns and/or wherein the gas bubbles have a mean pore size from 10-60 microns. These sizes can be measured by observation of representative SEM images taken of a sample of the product.

In order to calculate pore sizes from SEM images, 3 coffee particles are cut to reveal the internal structure and then stuck on an adhesive surface with the interior surface facing upwards prior to being placed in the SEM. Any commercially available SEM machine that can resolve pores down to 1 micron can be used. One photo from each particle at 400× magnification is taken. This image is then analysed. Gas pores are considered to be predominantly spherical pores. Ice pores are considered to be predominantly angular, or dendritic in shape (i.e. have a longest diameter much greater than a shortest diameter, such as at least 2:1). Pores existing inside other pores (Predominantly ice pores intersecting gas pores) are included in the measurement. To measure the size of the pores, the measurement is taken on the longest side. All pores in the photo are assigned as either gas or ice pores and the numerical average for each pore type from the set of 3 images is taken as the average pore size for each pore type.

Measuring Crema

Prior art freeze-dried coffee powders, by virtue of their open pore system are not considered capable of forming a crema. This is demonstrated in Table 1 below which compares the crema achieved using the powder disclosed herein in comparison to three prior art powders.

TABLE 1

| Sample | Foam Volume (ml/g) | Foam Coverage T = 0 mins (%) | Foam Coverage T = 2 mins (%) | Foam Coverage T = 5 mins (%) |
| --- | --- | --- | --- | --- |
| Inventive Sample (Example 1) | 0.875 | 99.5 | 98.9 | 98.5 |
| Prior Art i | 0.18 | 90.3 | 37.6 | 26.6 |
| Prior Art ii | 0.10 | 96.4 | 23.7 | 9.4 |
| Prior Art iii | 0.05 | 56.2 | 6.9 | 4.7 |

In these examples, the level of crema was measured as the total foam formed when 4 g of coffee is reconstituted in the vessel with 200 ml of 85° C. de-ionised water. This provides a coffee concentration of 2%.

Foam Volume

Figure 7:
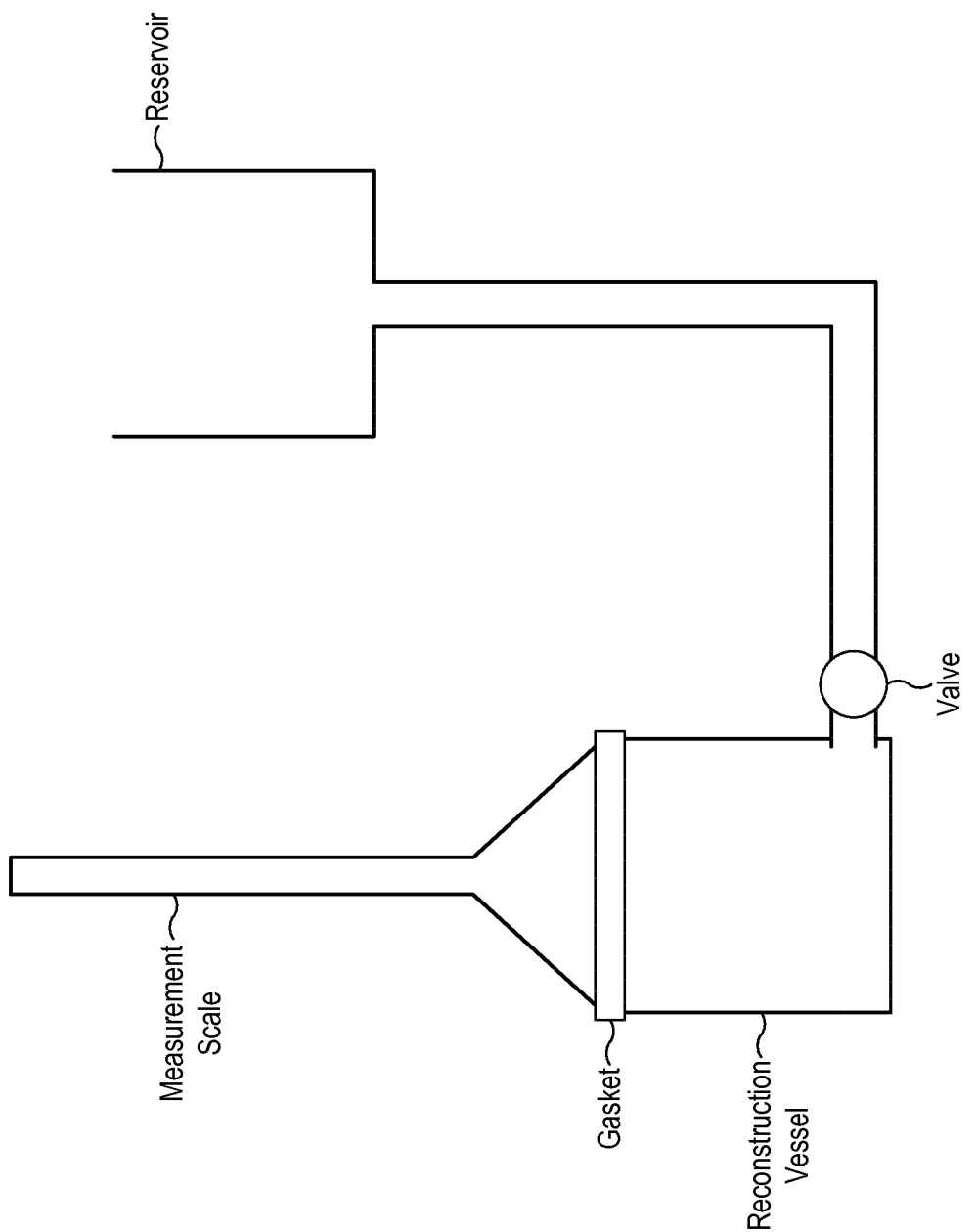
FIG. 7 shows an exemplary apparatus for determining the crema volume formed.

An apparatus for facilitating foam volume measurements is shown in FIG. 7. 4 g of coffee is reconstituted in the vessel with 200 ml of 85° C. de-ionised water. The measuring cylinder is placed on the gasket, on top of the reconstitution vessel and clamped in place. The valve between the reservoir and the vessel is opened gradually to force the crema layer up into the measuring cylinder. When the whole of the Crema sits within the scale of the measuring cylinder the valve is closed and the Crema volume read from the scale (accurate to 1 d.p). The reservoir contains preferably water of room temperature or below. All measurements carried out in triplicate and averaged to 1 d.p.

Preferably the crema produced is in an amount of at least 0.4 ml/g, more preferably at least 0.5 ml/g, more preferably at least 0.7 g/ml, and more preferably from 0.25 ml/g to 2.5 ml/g, most preferably from 0.75 to 1.5 ml/g.

Coverage

Foam coverage can be estimated using photo-editing software. Using this technique, photos of the beverage surface are converted into black and white and the relative peak heights for white and black can be read to provide a percentile of foam coverage. In order to determine coverage over time, three photos are taken at intervals of 0, 2 and 5 minutes. Crema coverage levels should be measured using the coffee powder alone, i.e. in the absence of milk, as this affects the accuracy of the method.

Alternatively, the percentage coverage can be determined by inspection using a regular grid of at least 10×10 to approximate the surface to squares of coverage and non-coverage.

Porosity

The particles have a closed porosity of less than 15%, preferably less than 10%, preferably less than 5% and most preferably substantially no closed porosity.

Closed pore volume can be measured by the following method.

The total particle volume ($V_t$) is made up of coffee matrix ($V_m$), closed pores ($V_c$) and open pores ($V_o$).

For a given mass of coffee, it is straight-forward to calculate the volume of the coffee matrix using known values for the density of the coffee matrix from literature. Instant coffee typically has a matrix density of 1.488 g/ml. Therefore, the specific volume is simply the inverse of the density, or 0.672 ml/g.

Next, it is necessary to measure the closed pore volume. For this, it is necessary to measure the skeletal density (g/cm$^3$) of the material by measuring the volume of a weighed amount of powder or granules using a helium Pycnometer (Micromeritics AccuPyc 1330) and dividing weight by volume. Skeletal density is a measure of density that includes the volume of any voids present in the particles that are sealed to the atmosphere and excludes the interstitial volume between particles and the volume of any voids present in the particles that are open to the atmosphere. The volume of sealed voids, referred to herein as closed pore volume, is derived from also measuring the skeletal density of the powder or granules after grinding with mortar and pestle to remove or open all internal voids to the atmosphere. This type of skeletal density, referred to herein as true density (g/cm$^3$) is the actual density of only the solid matter comprising the powder or granules. Closed pore volume, $V_c$ (cm$^3$/g) is determined by subtracting the reciprocal true density (cm$^3$/g) from the reciprocal skeletal density (cm$^3$/g).

Next, it is required to measure the open pore volume, for this, Mercury Porosimetry is used (see method in next section). Once the intrusion curve has been produced, this can be analysed to give a value for the volume of open pores. The intrusion below 2 psi (equal to pore sizes greater than 100 microns) is ignored, as these voids are considered to be interstitial voids (corroborated from SEM images). Next, the intrusion volume from an intrusion pressure above 2 psi is considered to be equal to the total volume of open pores in the sample.

Preferably the particles have an open porosity of at least 50%, preferably from 60 to 80% and most preferably from 60 to 70%.

Closed porosity can be calculated by;

Closed Porosity (%)=$V_c/(V_c+V_m+V_o)$

It is also known to measure open pores having a pore size of less than 2 microns and to add them to the closed pores to arrive at a so-called "foaming porosity". A suitable measurement method is discussed in EP2194795. The total intrusion volume minus the intrusion volume occurring below an intrusion pressure of 100 psi (equal to a pore size of 2 μm) gives the intrusion volume derived from pores with an opening of less than 2 μm ($V_{o<2\ um}$).

Therefore, 'foaming' porosity can be calculated by;

'Foaming' Porosity (%)=$(V_c+V_{o<2\ um})/(V_c+V_m+V_o)$

Preferably the freeze-dried powder discussed herein has a foaming porosity of less than 25%, more preferably less than 20%.

Mercury Porosimetry

Mercury porosimetry involves the analysis of intrusion of mercury into a sample under increasing pressure. Once the pores of a sample are entirely filled, an increase in pressure gives no further reduction in volume. The inventors have found that the low interconnectivity can be quantified by examining the amount of mercury intrusion into the pores. Once a mercury porosimetry plot has been obtained it is possible to measure the extent of intrusion at different values of pressure and to determine the pressure required for different levels of intrusion.

The inventors have found that the intrusion is characteristic of the pore structure and have considered intrusion at a pressure of 40 psia and 90 sia Hg, as well as the intrusion span discussed below. While typical freeze-dried powders are virtually fully penetrated by Hg at 40 psia, the powders described herein have only achieved less than 80% penetration. This demonstrates the difficulty that the Hg has in penetrating the low-interconnectivity of the particles. It must be noted that this is not the result of closed porosity which is separately assessed.

As noted above, mercury porosimetry can also be used to evaluate the micro-structure. The samples described herein were analysed using a MicroActive AutoPore V 9620 Version (Micromeritics Inc. Norcrose, Ga., USA). The machine uses mercury of 99.999% purity and applying a mercury contact angle of 140 degrees and surface tension of 480 dynes/cm$^2$ for both advancing and receding conditions. The operation pressure for Hg intrusion was from 0.3 psia to 60,000 psia. The pore diameter which can be measured under this pressure ranged from 1000 to 0.00356 μm.

The inventors have found that the measurements for Hg intrusion are most reliable when the baseline is taken as 2 psia. This helps to disregard any inter-particle void space which can otherwise lead to an unwanted variance in the measurements. The results below in Tables 2 and 3 show this variance. Therefore, preferably the intrusion into the particles is considered to start at 2 psia (as in Table 2). According to a less preferred embodiment the intrusion is considered to start at 0.3 psia (as in Table 3). The values for either baseline can be calculated from the same mercury porosimetry plot.

The samples, having a nominal sample mass of 0.15 g, were degassed before testing under vacuum for 10 hours at room temperature.

For testing, 0.1 to 0.4 g of samples were precisely weighed and packed in a penetrometer (volume 3.5 ml, neck or capillary stem diameter 0.3 mm and stem volume of 0.5 ml). After the penetrometer was inserted to the lower pressure port, the sample was evacuated at 1.1 psia/min, and then switched to a medium rate at 0.5 psia and a fast rate at 900 μm Hg. The Evacuating target is 60 μm Hg. After reaching the target, the evacuation was continued for 5 min before Hg was filled in.

The measurement was conducted in set-time equilibration. That, is, the pressure points at which data are to be taken and the elapsed time at that pressure in the set-time equilibration (10 sec) mode. Roughly 140 data points were collected at the pressure ranges.

The intrusion graph can be used to judge the internal structure of the coffee particle. As mentioned above, Mercury Porosimetry covers a wide range of pore sizes, from about 1000 microns down to the sub-micron range. It is known from SEM images that pores in the coffee powder are less than 100 microns in diameter. When judging the internal structure of the powder the intrusion occurring above 2 psia appears to correlate to a pore size of 100 microns.

Figure 4A:
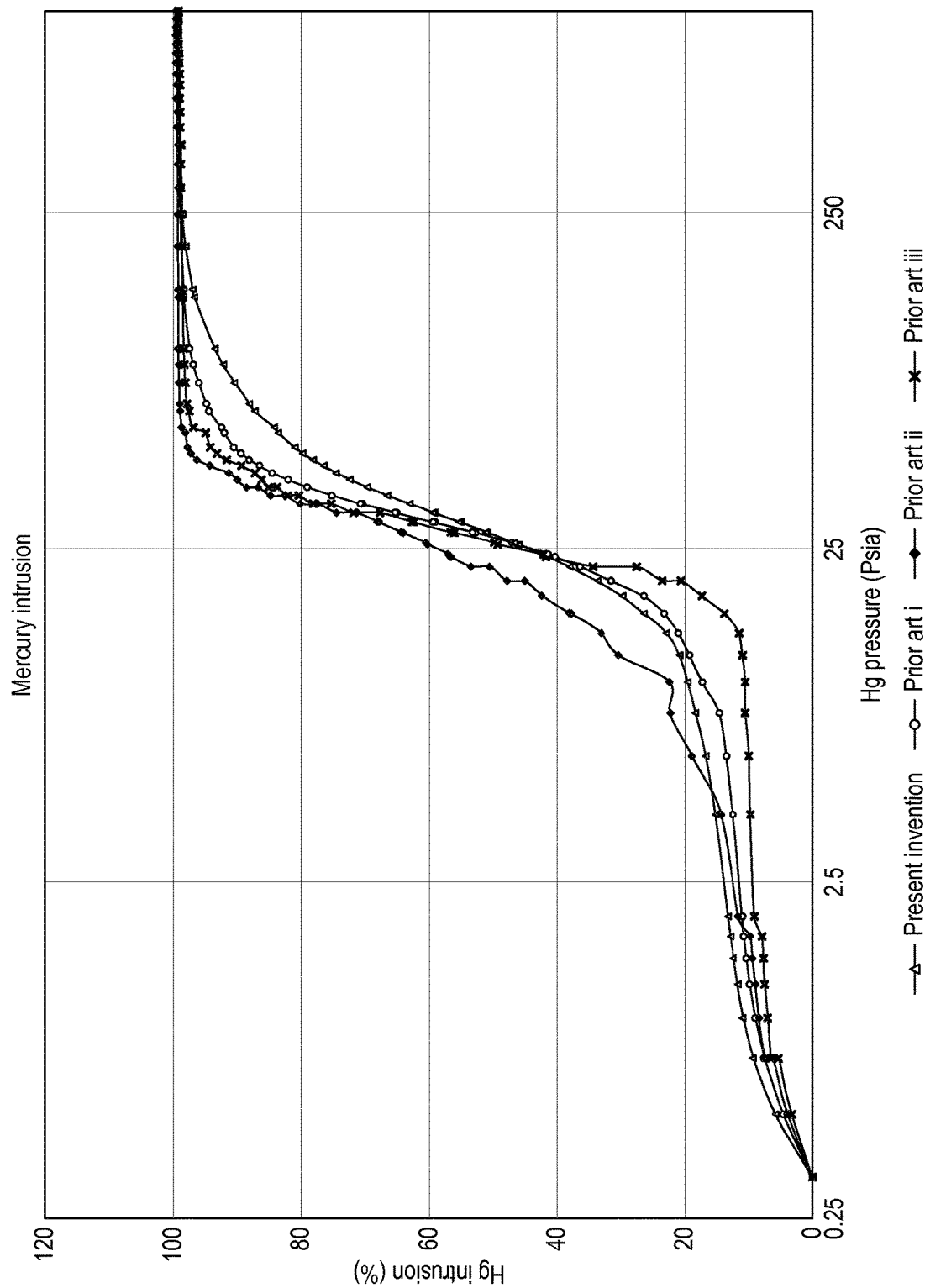
FIG. 4A shows a plot of Hg intrusion (%) on the y-axis against Hg pressure (Psia) on the x axis (with a logarithmic scale). The x-axis values are 0.25, 2.5, 25 and 250. The y-axis values increment in 20% values from 0%. Four plots are shown including three prior art powders and a powder according to the present disclosure. Triangles show the plot of the present invention. Prior art samples I, ii and iii are shown by light circles, dark rhombuses and crosses respectively. The powder according to the present disclosure is the last to be fully intruded.
Figure 4B:
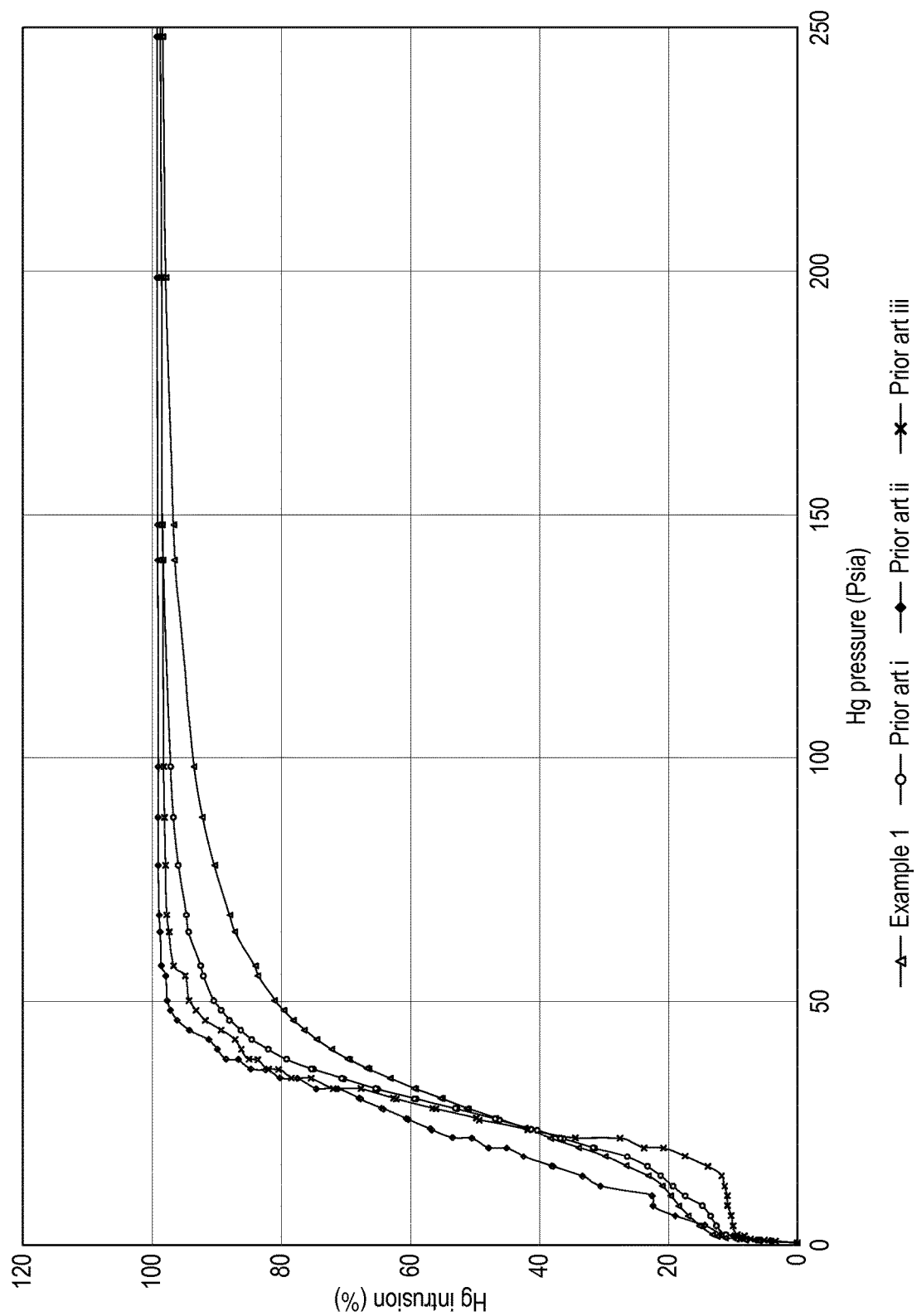
FIG. 4B shows the same plot as FIG. 4A, but with a non-logarithmic pressure scale. The x-axis values are 0, 50, 100, 150, 200 and 250. The y-axis values increment in 20% values from 0%. Again, Triangles show the plot of the present invention. Prior art samples I, ii and iii are shown by light circles, dark rhombuses and crosses respectively.
Figure 5:
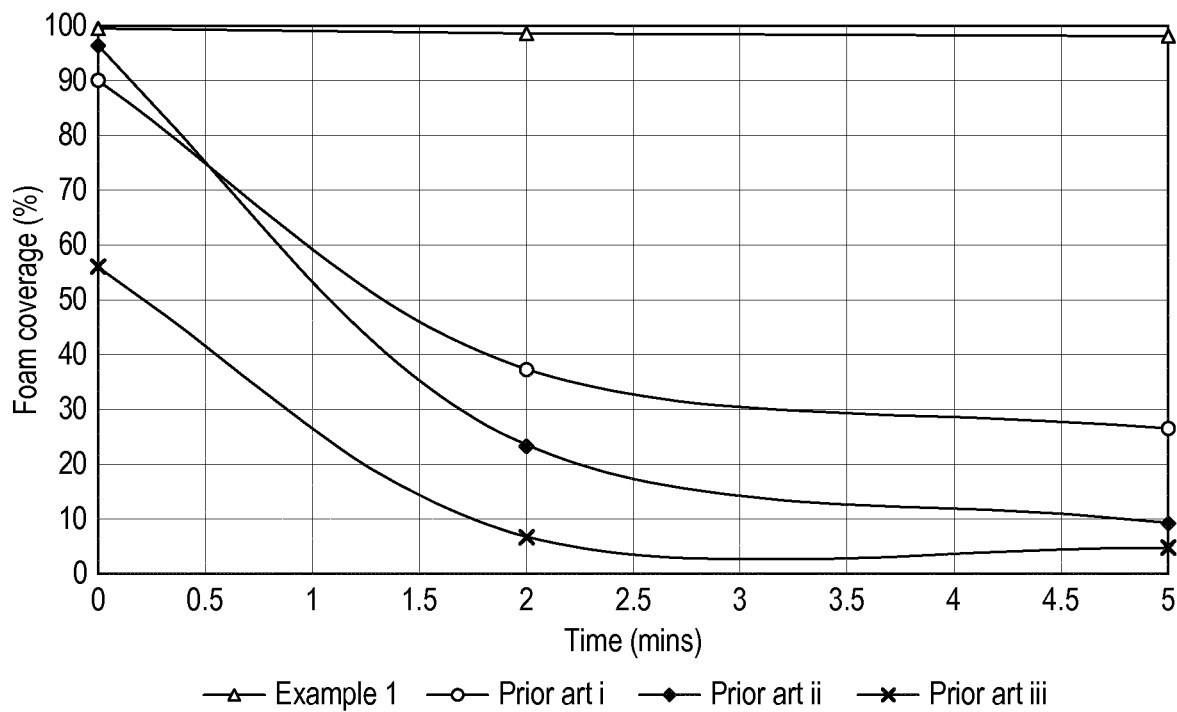
FIG. 5 shows foam coverage (%) over time (mins) on a reconstituted coffee beverage for three prior art powders and a powder according to the present disclosure. Triangles show the plot of the present invention. Prior art samples I, ii and iii are shown by light circles, light rhombuses and dark crosses respectively.
Figure 6:
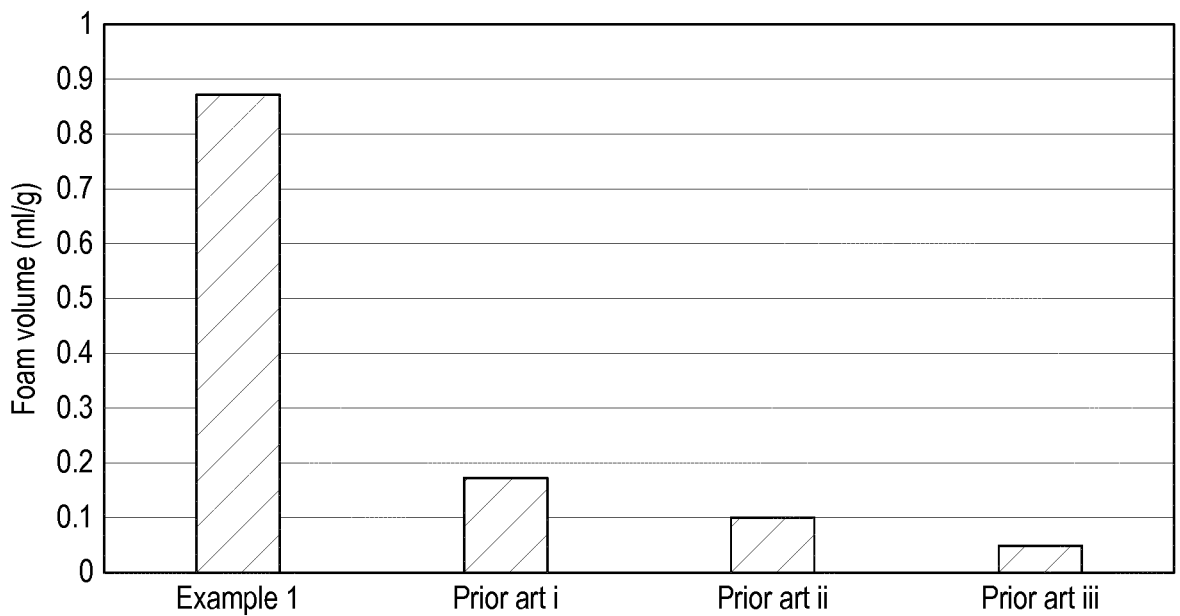
FIG. 6 shows foam volume in ml/g for a reconstituted coffee beverage for three prior art powders and a powder according to the present disclosure.

FIG. 4 shows the whole intrusion graph (% total intrusion) for the present invention and 3 prior art products. It is clear that greater pressures are required to fill the internal structure of the present invention when compared to the pressure required to fill the internal structure of the prior art products. Without wishing to be bound by theory, it is hypothesized that this is due to the reduced interlinking of pores in the present invention. i.e. in the prior art products there are many routes to fill the internal pores, whereas in the present invention there are comparatively few routes to fill the internal pores, therefore in the present invention the mercury is required to travel through pores of ever decreasing size to fill all of the pore space, requiring increased pressures.

TABLE 2

| Sample | Hg psia @ 80% intrusion (2 psia baseline) | % Intrusion at 90 psi (2 psia baseline) | Foam (ml/g) | Span |
|---|---|---|---|---|
| Example 1 | 53.2 | 91.4 | 0.875 | 2.27 |
| Example 6 | 33.57 | 90.62 | 1 | 4.35 |
| Example 7 | 67.43 | 83.9 | 1.05 | 7.55 |
| Example 8 | 32.82 | 89.4 | 0.9 | 5.7 |
| Example 9 | 50.42 | 88.7 | 0.65 | 2.96 |

TABLE 2-continued

| Sample | Hg psia @ 80% intrusion (2 psia baseline) | % Intrusion at 90 psi (2 psia baseline) | Foam (ml/g) | Span |
|---|---|---|---|---|
| Prior Art i | 40.1 | 96.6 | 0.18 | 1.35 |
| Prior Art ii | 39.5 | 97.6 | 0.1 | 1.87 |
| Prior Art iii | 41.3 | 94 | 0.05 | 1.82 |

With reference to Table 2, Example 1 is described in more detail below as a fully worked example. Examples 6-9 were made in accordance with the method in Example 5, below, with the following additional changes. In Example 6 the temperature of the aerated extract transferred to the crystalliser vessel was +5° C. (i.e. relatively warm). In Example 7 the coolant temperature in the jacket of the crystalliser was −10° C. In Example 8 the speed of the agitator in the crystalliser vessel was 12 rpm. In Example 9 the $N_2$ was added before the extract was fed into the high pressure pump, using a 'Mondo' mixer, and the foam density prior to the freezing step was 780 g/l.

The examples in Table 3, below, show the results when considering 0% intrusion to be the value at 0.3 psia (i.e. 0.3 psia baseline).

TABLE 3

| Sample | Psia at 80% intrusion (0.3 psia baseline) | % of total intrusion volume at 90 Psi (0.3 psia baseline) |
|---|---|---|
| Example 1 | 47.97 | 93.0 |
| Prior Art i | 37.98 | 98.3 |
| Prior Art ii | 34.00 | 99.2 |
| Prior Art iii | 35.94 | 99.1 |

TABLE 4

| Sample | Closed Pore Volume (%) | Open Pore Volume (%) | Open Pores <2 microns diameter volume (%) | Foaming porosity (%): Sum of closed pores and open pores <2 microns |
|---|---|---|---|---|
| Example 1 | 3.09 | 67.29 | 4.80 | 7.89 |
| Prior Art i | 6.44 | 64.73 | 1.36 | 7.80 |
| Prior Art ii | 1.93 | 65.72 | 0.08 | 2.01 |
| Prior Art iii | 1.70 | 69.70 | 0.96 | 2.66 |

Nonetheless, it is difficult to characterise the internal pore sizes of the freeze-dried coffee powder described herein with traditional methods, such as Micro computed X-Ray tomography, due to the predominantly open structure. X-Ray tomography methods known in the art rely on 'closing' the structure to give statistical data. In this case, this is not appropriate as it causes the detail of the ice crystal pores to be lost. Mercury porosimetry, while giving an indication of some features of the internal structure, is also not applicable to calculate average pore size due to the limitations of the models used in the calculation. For example, in Mercury porosimetry Total pore area is calculated from successive elements of the pore volume data based on a model of non-intersecting, cylindrical pores.

Surface Area Measurements

Pore area data should be regarded with caution and should not be confused with a BET surface area value which is more reliable for comparison purposes. $N_2$ adsorption has been used to give an idea of the average pore size. Higher surface areas indicate smaller internal pores.

TABLE 5

| Sample | BET surface area (m$^2$/g) |
|---|---|
| Present Invention (Example 1) | 0.4257 |
| Prior Art i | 0.3511 |
| Prior Art ii | 0.4003 |
| Prior Art iii | 0.3787 |

The BET surface area, assuming constant density, gives an idea of average pore size. Here the present invention exhibits a higher internal surface area than the prior art. SEM images have shown that the ice crystal pores are larger in the present invention than in the prior art. Therefore, it is reasonable to assume that the average gas bubble size in the present invention is smaller than in the prior art. This is caused by the new aeration method and therefore it is deemed that the aeration method is a key part of the invention.

A Micromeritics TriStar II Plus (3020) is used for the collection of nitrogen adsorption data by a volumetric method. Samples of 1 g are degassed prior to analysis, typically for at least 10 hours under vacuum at room temperature.

Samples are weighed into a sample tube such that sufficient sample is provided for analysis. Free space is measured automatically as part of the analytical procedure using helium (N5 grade). Analysis is conducted at cryogenic temperature: liquid nitrogen at 77K. Nitrogen adsorption data is collected at relative pressures within the BET range (approximately 0.05 to 0.30).

The relative pressure range applied to BET surface area reports is selected by inspection of the adsorption isotherm and BET transform plot. Collected data points are included so that the BET transform plot is linear within the BET range (where the sample type permits) and the C-Value is positive. Where possible, a correlation coefficient of the transform plot of 0.999 or better is sought. The Nominal BET Range Applied for the above samples was 0.05-0.20.

The invention will now be described in relation to the following non-limiting examples.

EXAMPLE 1

A *Robusta* coffee extract produced on a conventional counter current percolation set was concentrated to 50% solids by mass. The extract was heated to 35° C. and fed into a high pressure pump. The pressure of the extract was increased to 50 bar. $N_2$ was injected into the extract under pressure in an amount of 4.5 NL/Kg. The pressurised gasified extract was passed through a static mixer to reduce the size of the gas bubbles ensuring that the $N_2$ gas would be substantially dissolved in the extract. The extract with dissolved gas was passed through a spraying system SK series spray nozzle (67/20) to effect a pressure drop to atmospheric pressure. The resulting foamed extract had a density of 710 g/l. The foamed extract was placed into a tray and cold air, with a temperature of −35° C. was blown onto the surface of the foamed extract to rapidly cool the foamed extract to −5° C. When −5° C. was reached the fans were turned off and the extract was allowed to cool slowly to −11° C. over a period of 35 minutes. The freezing point of the coffee extract at 50% solids by mass is approx. −7.5° C. As a consequence the temperature of extract was between 1° C. above the freezing point and 3° C. below the freezing point for a period of about 25 minutes. When −11° C. was reached the fans were again turned on and the temperature of the foamed extract was reduced to −35° C. in a further 10 minutes. The tray was further cooled to −50° C. The frozen foamed extract was subsequently ground and sieved before being freeze-dried. The resultant product was tested using the foam volume apparatus. The freeze-dried granules produced a foam volume of 3.5 ml (0.875 ml/g).

EXAMPLE 2

A *Robusta* coffee extract produced on a conventional counter current percolation set was concentrated to 50% solids by mass. The extract was heated to 35° C. and fed into a high pressure pump. The pressure of the extract was increased to 50 bar. $N_2$, was injected into the extract under pressure in an amount of 4.2 NL/Kg. The extract with dissolved gas was passed through a spraying system SK series spray nozzle (67/20) to effect a pressure drop to atmospheric pressure. The resulting foamed extract had a density of 640 g/l. The foamed extract was placed into a tray and placed into a controlled temperature freezer. The ambient freezer temperature was set to be −35° C. to rapidly cool to the −5° C., once the coffee temperature reached −5° C. the ambient room temperature was set to −12° C. and after 30 minutes, the coffee temperature was recorded as −10.5° C., subsequently the temperature of the freezer was set to −35° C. to further freeze the aerated coffee extract. Finally, the tray of aerated frozen coffee extract was transferred to a −50° C. cold room. The freezing point of the coffee extract at 50% solids by mass is approx. −7.5° C. The temperature of the extract was between 1° C. above the freezing point (Approx. −6.5° C.) and 3° C. below the freezing point (Approx. −10.5° C.) for a period of 28 minutes. The tray was transferred to a cold room and further cooled to −50° C. to complete freezing. The frozen foamed extract was subsequently ground and sieved before being freeze-dried. The resultant product was tested using the foam volume apparatus. The freeze-dried granules produced a foam volume of 4.2 ml (0.775 ml/g).

EXAMPLE 3 (COMPARATIVE)

A *Robusta* coffee extract produced on a conventional counter current percolation set was concentrated to 50% solids by mass. The extract was heated to 35° C. and fed into a high pressure pump. The pressure of the extract was increased to 50 bar. $N_2$, was injected into the extract under pressure in an amount of 4.3 NL/Kg. The pressurised gasified extract was passed through a static mixer to reduce the size of the gas bubbles ensuring that the $N_2$ gas would be substantially dissolved in the extract. The extract with dissolved gas was passed through a spraying system SK series spray nozzle (67/20) to effect a pressure drop to atmospheric pressure. The resulting foamed extract had a density of 715 g/l. The foamed extract was placed into a tray and placed in a cold room of ambient temperature of −50° C. to rapidly cool the foamed extract. This was left until the product reached a temperature of around −45° C. The freezing point of the coffee extract at 50% solids by mass is approx. −7.5° C. The temperature of the extract was between 1° C. above the freezing point (Approx. −6.5° C.) and 3° C. below the freezing point (Approx. −10.5° C.) for a period of 4.5 minutes. The frozen foamed extract was subsequently ground and sieved before being freeze-dried. The resultant product was tested using the foam volume apparatus. The freeze-dried granules produced a foam volume of 0.5 ml (0.125 ml/g).

EXAMPLE 4

A *Robusta* coffee extract produced on a conventional counter current percolation set was concentrated to 50% solids by mass. The extract was held at 35° C. and fed into a 'Haas Mini Mondomix'. $N_2$ gas was injected into the mixer and the overrun was set to 87% with the mixing head speed at 1200 rpm. The pressure inside the Mini Mondo was 2.8 bar. The temperature of the foamed extract exiting the Mini Mondomix was 38° C. The resulting foamed extract had a density of 640 g/l. The foamed extract was placed into a tray under atmospheric pressure and then into a controlled temperature cabinet freezer where it was cooled rapidly to a temperature of −5° C. The ambient temperature of the freezer was then set to −12° C. to allow the extract to cool slowly through the point of ice formation and after 30 minutes, the coffee temperature was recorded as −11° C., subsequently the temperature of the freezer was set to −35° C. to further freeze the aerated coffee extract. Finally, the tray of aerated frozen coffee extract was transferred to a −50° C. cold room. The freezing point of the coffee extract at 50% solids by mass is approx. −7.5° C. The temperature of the extract was between 1° C. above the freezing point (Approx. −6.5° C.) and 3° C. below the freezing point (Approx. −10.5° C.) for a period of 25 minutes. The frozen foamed extract was subsequently ground and sieved before being freeze-dried. The resultant product was tested using the foam volume apparatus. The freeze-dried granules produced a foam volume of 2.35 ml (0.59 ml/g).

EXAMPLE 5

A *Robusta* and *Arabica* coffee extract blend produced on a conventional counter current percolation set was concentrated to 48% solids by mass. The extract was heated to 35° C. and fed into a high pressure pump. The pressure of the extract was increased to 50 bar. 1.05% $N_2$ by mass was injected into the extract under pressure. The pressurised, gasified extract was passed through a spraying systems SK series spray nozzle (67/20) to atmospheric pressure. The resulting foamed extract had a density of 640 g/l and a temperature of 34° C. The foamed extract was pumped through a heat exchanger with a glycol temperature of −5° C. to rapidly cool the extract to 0° C. When the extract had been rapidly cooled it was then transferred to a crystallizer vessel, consisting of a glycol jacketed tank and internal scraper. The glycol temperature was set at −12° C. and the surface scraper at a speed of 10 rpm. The foamed extract was slowly cooled to a temperature of −7.5° C. in the crystallizer over a period of 90 minutes. Subsequently, the extract was removed from the vessel and placed onto a tray. The extract in the tray was blast frozen down to −50° C. The temperature of the extract was between 1° C. above the freezing point (Approx. −6.5° C.) and 3° C. below the freezing point (Approx. −10.5° C.) for a period of 33 minutes, of which approximately 30 minutes was in the crystalliser and 3 minutes in the blast freezer. The frozen foamed extract was subsequently ground and sieved before being freeze-dried. The resultant product was tested using the foam volume apparatus previously described. The freeze-dried granules produced a foam volume of 3.8 ml (0.95 ml/g) and a coverage of 100% at makeup, 100% at 2 minutes and 66.4% after 5 minutes.

The product of this example was also assessed for its porosity with the following values being observed:

TABLE 6

| Sample | Open porosity | Close porosity | Foaming porosity | total porosity |
|---|---|---|---|---|
| Example 5 | 66.95% | 2.58% | 8.47% | 69.53% |

Unless otherwise stated, all percentages herein are by weight and all pressures are absolute, rather than gauge.

Although preferred embodiments of the invention have been described herein in detail, it will be understood by those skilled in the art that variations may be made thereto without departing from the scope of the invention or of the appended claims.

The invention claimed is:

1. A method for the manufacture of a freeze-dried coffee powder, the method comprising:
    providing a coffee extract having from 40 wt % to 55 wt % solids;
    adding gas to the coffee extract in an amount of from 1 NL/kg to 5 NL/kg of coffee extract, to provide a gas-containing coffee extract at above atmospheric pressure;
    depressurising the gas-containing coffee extract to form a foamed coffee extract;
    cooling the foamed coffee extract to below −40° C. without shear, or with low shear, to form a frozen coffee extract,
    grinding the frozen coffee extract to a powder; and
    drying the powder,
    wherein the step of cooling the foamed coffee extract to below −40° C. comprises:
        (i) cooling the foamed coffee extract to a first temperature;
        (ii) cooling the foamed coffee extract from the first temperature to a second temperature lower than the first temperature; and
        (iii) cooling the foamed coffee extract from the second temperature to below −40° C.,
    wherein the first temperature is 1° C. above a freezing point of the foamed coffee extract and wherein the second temperature is 3° C. below the freezing point, wherein step (ii) has a duration of from 5 to 90 minutes.

2. The method according to claim 1, wherein the coffee extract:
    (a) has from 40 to 45 wt % solids and wherein the freezing point is from −5 to −7° C.; or
    (b) has from 45 to 50 wt % solids and wherein the freezing point is from −7 to −8° C.; or
    (c) has from 50 to 55 wt % solids and wherein the freezing point is from −8 to −10° C.

3. The method according to claim 1, wherein the coffee extract has from 48 to 51 wt % solids.

4. The method according to claim 1, wherein the low shear is less than 50 s$^{-1}$.

5. The method according to claim 1, wherein the gas is selected from nitrogen, air, argon, nitrous oxide and carbon dioxide, or a mixture of two or more thereof.

6. The method according to claim 1, wherein the coffee extract is at a pressure of at least 2 Bar before the gas is added to the coffee extract.

7. The method according to claim 1, wherein depressurising the gas-containing coffee extract involves reducing the pressure of the coffee extract to 5 Bar or less.

8. The method according to claim 1, wherein depressurising the gas-containing coffee extract involves spraying the gas-containing coffee extract.

9. The method according to claim 1, wherein the foamed coffee extract is at atmospheric pressure before the step of cooling and has a density of from 500 to 800 g/l.

10. The method according to claim 1, wherein the mean rate of cooling in each of steps (i) and (iii) is at least −5° C. per minute.

11. The method according to claim 1, wherein one or more of the cooling steps (i), (ii) and (iii) are conducted as a continuous process using a conveyor.

12. The method according to claim 1, wherein one or more of the cooling steps (i), (ii) and (iii) are conducted in a holding vessel or within a pumped cooling system.

13. The method according to claim 1, wherein step (ii) has a duration of from 5 to 60 minutes.

14. The method according to claim 1, wherein step (ii) has a duration of from 10 to 30 minutes.

15. The method according to claim 1, wherein the coffee extract is at a pressure of at least 5 Bar before the gas is added to the coffee extract.

16. The method according to claim 1, wherein the coffee extract is at a pressure of from 10 to 250 Bar before the gas is added to the coffee extract.

17. The method according to claim 1, wherein depressurising the gas-containing coffee extract involves reducing the pressure of the coffee extract to atmospheric pressure.

* * * * *